United States Patent
Sato et al.

(10) Patent No.: US 8,652,989 B2
(45) Date of Patent: Feb. 18, 2014

(54) PHOTOCATALYST AND REDUCING CATALYST USING THE SAME

(75) Inventors: Shunsuke Sato, Aichi-gun (JP); Takeshi Morikawa, Seto (JP); Tomiko Mori, Seto (JP); Shu Saeki, Nisshin (JP); Tsutomu Kajino, Toyoake (JP); Hiromitsu Tanaka, Aichi-gun (JP)

(73) Assignee: Kabushiki Kaisha Toyota Chuo Kenkyusho, Aichi-Gun (JP)

( * ) Notice: Subject to any disclaimer, the term of this patent is extended or adjusted under 35 U.S.C. 154(b) by 41 days.

(21) Appl. No.: 13/057,645

(22) PCT Filed: Aug. 10, 2009

(86) PCT No.: PCT/JP2009/064368
§ 371 (c)(1),
(2), (4) Date: Feb. 4, 2011

(87) PCT Pub. No.: WO2010/018871
PCT Pub. Date: Feb. 18, 2010

(65) Prior Publication Data
US 2011/0143929 A1 Jun. 16, 2011

(30) Foreign Application Priority Data

Aug. 11, 2008 (JP) ................................ 2008-206715
Aug. 7, 2009 (JP) ................................ 2009-184051

(51) Int. Cl.
*B01J 27/043* (2006.01)

(52) U.S. Cl.
USPC ........................................................ 502/222

(58) Field of Classification Search
None
See application file for complete search history.

(56) References Cited

U.S. PATENT DOCUMENTS

| 4,684,537 A | 8/1987 | Graetzel et al. |
| 2003/0013607 A1 | 1/2003 | Morikawa et al. |
| 2008/0073618 A1 | 3/2008 | Inagaki et al. |

FOREIGN PATENT DOCUMENTS

| EP | 1 066 878 A1 | 1/2001 |
| EP | 1066878 A1 * | 1/2001 |
| EP | 1 894 628 A2 | 3/2008 |
| JP | A-61-502402 | 10/1986 |
| JP | A-06-126189 | 5/1994 |
| JP | B2-2526396 | 8/1996 |
| JP | A-2002-179420 | 6/2002 |
| JP | A-2004-059507 | 2/2004 |
| JP | A-2004-097954 | 4/2004 |
| JP | B2-3590837 | 11/2004 |
| JP | 2005279403 A * | 10/2005 |
| JP | A-2006-89336 | 4/2006 |
| JP | 2008-84836 | 4/2008 |
| WO | WO 02/49478 A1 | 6/2002 |

OTHER PUBLICATIONS

English translation jp2005279403a.*

(Continued)

*Primary Examiner* — Melvin C Mayes
*Assistant Examiner* — Stefanie Cohen
(74) *Attorney, Agent, or Firm* — Oliff & Berridge, PLC

(57) ABSTRACT

To provide a photocatalyst having high selectivity and carrying out a reductive reaction with light having a longer wavelength. A photocatalyst has a structure in which a semiconductor and a substrate are joined, in which the substrate causes a catalytic reaction by transfer to the substrate of excited electrons, which are generated by applying light to the semiconductor.

15 Claims, 3 Drawing Sheets

(56) References Cited

OTHER PUBLICATIONS

Schwarz et al, Preparation and application of new ruthenium(II) polypyridyl complexes as sensitizers for nanocrystalline TiO2, 2000, Journal of Photochemistry and Photobiology A: Chemistry, pp. 91-98.*

Zahn et al, the transport gap of organic semiconductors studied using the combination of direct and inverse photoemission, 2006, chemical physics, pp. 99-112.*

Takeda et al, Development of an Efficient Photocatalytic System for CO2 Reduction Using Rhenium(I) Complexes Based on Mechanistic Studies, Jan. 2008, J. Am. Chem., 130, pp. 2023-2031.*

Blumstengel et al, Electronic coupling of optical excitations in organic/inorganic semiconductor hybrid structures, Jun. 2008, New Journal of Physics, pp. 1-17.*

Inoue et al., "Photoelectrocatalytic reduction of carbon dioxide in aqueous suspensions of semiconductor powders," *Nature*, vol. 277, pp. 637-638, Feb. 22, 1979.

Sato et al., "High Efficient Photocatalytic Reduction of Carbon Dioxide Using Ruthenium-Rhenium Supramolecular Complexes," *Catalysts & Catalysis*, vol. 49, No. 1, pp. 48-53, 2007 (With Partial Translation).

Wang et al., "Light-induced amphiphilic surfaces," *Nature*, vol. 388, pp. 431-432, Jul. 31, 1997.

Written Opinion of the International Searching Authority issued in Application No. PCT/JP2009/064368; Dated Jan. 13, 2010.

International Search Report issued in Application No. PCT/JP2009/064368; Dated Jan. 13, 2010.

European Office Action issued in Application No. 09 788 034.8; Dated Sep. 14, 2011.

Grätzel, Michael, "Mesoscopic Solar Cells for Electricity and Hydrogen Production from Sunlight", Chemistry Letters, pp. 8-13, vol. 34, No. 1 (2005).

Morris et al., "Molecular Approaches to the Photocatalytic Reduction of Cardon Dioxide for Solar Fuels", Accounts of Chemical Research, vol. 42, No. 12, Dec. 2009.

Dec. 4, 2012 Office Action issued in Japanese Patent Application No. 2009-184051 (with translation).

Nov. 5, 2013 Office Action issued in Japanese Application No. 2009-184051 (with partial translation).

Ozcan et al., Dye Sensitized Artificial Photosynthesis in the Gas Phase Over Thin and Thick $TiO_2$ Films Under UV and Visible Light Radiation, Applied Catalysis B: Environmental, 2001, vol. 71, pp. 291-297.

Khan et al., Synthesis and Characteristics of Mixed Ligand Ru (III) Complexes with EDTA-polypyridyl, and $Pt/TiO_2/RuO_2$ Semiconductor Particulate System Modified by the Complexes, Journal of Photochemistry and Photobiology A: Chemistry, 1993, vol. 76, pp. 97-101.

* cited by examiner

PHOTOCATALYST AND REDUCING CATALYST USING THE SAME

TECHNICAL FIELD

The present invention relates to a photocatalyst and a catalyst for obtaining a reduced product by means of the same.

BACKGROUND ART

The document (Nature Vol. 277, pp 637-638, 1979) discloses a technique for producing formaldehyde, formic acid, methane, methanol, etc. by suspending a catalyst powder formed of a semiconductor such as titanium oxide in water and supplying carbon dioxide to the suspension solution while applying light from an artificial light source such as a xenon lamp or a high-pressure mercury-vapor lamp.

Furthermore, Japanese Patent No. 2526396 discloses a method for producing hydrogen and oxygen from water by use of optical energy; more specifically, by irradiating a zirconium oxide semiconductor with light, and a method for producing hydrogen, oxygen, and carbon monoxide from water and carbon dioxide.

Moreover, Japanese Patent No. 3590837 discloses a technique for selectively reducing carbon dioxide to carbon monoxide by dissolving a photocatalyst, which is selected from metal complexes whose charge absorption band between a metal and a ligand falls within the range from the ultraviolet light region to the visible light region, and an electron donor selected from organic amines; introducing carbon dioxide into the organic solvent at a high pressure of 0.2 to 7.5 MPa; and applying light to the organic solvent under the pressure.

In the document Nature (Vol. 277, pp 637-638, 1979) mentioned above, formaldehyde, formic acid, methane, methanol, etc. are produced simultaneously; whereas, in Japanese Patent No. 2526396, hydrogen alone is produced or hydrogen and carbon monoxide are produced simultaneously. An inorganic semiconductor photocatalyst is characterized in that hydrogen or not less than two types of reduced forms of carbon dioxide can be simultaneously produced by light irradiation. However, from an industrial point of view, the ability to obtain a product with high selectivity is important.

Furthermore, Japanese Patent No. 3590837 mentioned above shows reduction treatment using a rhenium complex. When a rhenium complex is used, it is known that carbon monoxide tends to be advantageously and selectively produced. When a rhenium complex is used a photocatalyst, the rhenium complex absorbs visible light (realizing a carbon dioxide reductive reaction) within the range of 450 nm or less. Absorption light is limited to a relatively short wavelength.

Japanese Patent No. 3590837 mentioned above describes other metal complexes; however, possible metal elements are simply enumerated, and they are not put into practice.

Further, although it is known in the field of a dye-sensitized solar cell that a ruthenium complex can absorb light having long wavelength depending on its Ru(bpy)$_3$ (bpy: bipyridine) structure, photocatalytic reaction is not obtained with such a structure. The ruthenium complex Ru(bpy)$_2$(CO)$_2$ having this structure actually carries out an electrochemical catalytic reaction alone to produce formic acid from carbon dioxide with high product selectivity.

SUMMARY OF THE INVENTION

According to an aspect of the present invention, there is provided a photocatalyst having a structure in which a semiconductor and a substrate coexist in a State where they exchange electrons with each other, and the substrate causes a catalytic reaction by at least transfer to the substrate of excited electrons which are generated on the semiconductor by applying light to the semiconductor.

DESCRIPTION OF THE EMBODIMENTS

Figure 1:
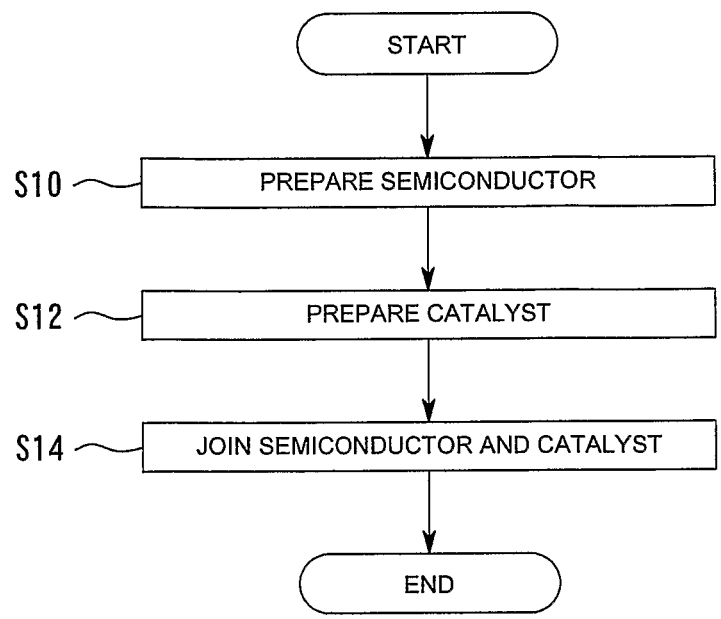
FIG. 1 is a flowchart showing manufacturing steps of a photocatalyst according to an embodiment of the present invention.

FIG. 1 shows a flowchart of manufacturing steps of a photocatalyst and a reducing catalyst using the same according to an embodiment of the present invention.

In Step S10, a semiconductor material is prepared. The semiconductor is made of a material which has a value of 0.2 eV or less obtained by subtracting an energy level value of the lowest unoccupied molecular orbital by electrons of the below-noted base materials, from an energy-level value of the conduction band minimum of the semiconductor. Materials may be tantalum oxide, tantalum nitride, tantalum oxynitride, nickel-containing zinc sulfide, copper-containing zinc sulfide, zinc sulfide, gallium phosphide, iron oxide, silicon carbide, and an oxide of copper.

The tantalum nitride and tantalum oxynitride can be produced by treating tantalum oxide with heat in an atmosphere containing ammonia gas. Ammonia is preferably diluted with a non-oxidative gas (such as argon or nitrogen). Tantalum oxide is preferably placed, for example, in gas flow prepared by mixing ammonia and argon at equal flow rates, and heated. The heating temperature is preferably 500° C. to 900° C., and further preferably 650° C. to 850° C. The treatment time is 6 hours to 15 hours. As tantalum oxide before ammonia treatment, there can be used e.g., a commercially available crystalline tantalum oxide or amorphous tantalum oxide, which is obtained by applying a hydrolysis treatment to a solution containing a tantalum compound such as tantalum chloride.

The nickel-containing zinc sulfide can be obtained by dissolving a nickel-containing hydrate and a zinc-containing hydrate; adding to the above solution an aqueous solution having a sodium sulfide hydrate dissolved therein, stirring the mixture, subjecting the mixture to centrifugal separation and redispersion, removing the supernatant, and drying the resultant substance. As the nickel-containing hydrate, e.g., nickel (II) nitrate 6 hydrate can be used. As the zinc-containing hydrate, e.g., zinc (II) nitrate 6 hydrate can be used. As the nickel source used herein, other than those mentioned above, nickel chloride, nickel acetate, nickel perchlorate, nickel sulfate, and the like can be used. Furthermore, as the zinc source, zinc chloride, zinc acetate, zinc perchlorate, zinc sulfate, and the like can be used.

Similarly, the copper-containing zinc nitrate can be obtained by dissolving a copper-containing hydrate and a zinc nitrate hydrate, adding a sodium sulfide hydrate to the above solution, stirring the mixture, subjecting the mixture to centrifugal separation and redispersion, removing the supernatant, and drying the resultant substance. As the copper-containing hydrate, e.g., copper (II) nitrate 2.5 hydrate can be used. As the zinc-containing hydrate, e.g., zinc (II) nitrate 6 hydrate can be used. As the copper source used herein, other than those mentioned above, copper chloride, copper acetate, copper perchlorate, copper sulfate, and the like can be used. Furthermore, as the zinc source, zinc chloride, zinc acetate, zinc perchlorate, zinc sulfate, and the like can be used.

In step S12, a substrate material is prepared. The substrate should be a substance having an energy-level value of its unoccupied orbital smaller than or up to 0.2 V (i.e., eV) greater than the energy-level value of the conduction band minimum of the semiconductor prepared in step S10. A metal complex can be used as the substrate. For example, rhenium complexes having a carboxybipyridine ligand, such as ((Re (dcbpy)(CO)$_3$P(OEt)$_3$)), ((Re(dcbpy)(CO)$_3$Cl)), Re(debpy) (CO)$_3$MeCN, and Re(debqi)(CO)$_3$MeCN can be used.

In step S14, a photocatalyst is synthesized by joining the semiconductor and the substrate. The semiconductor prepared in step S10 and the substrate prepared in step S12 are mixed in a solvent and stirred and dried to synthesize the photocatalyst having the semiconductor and the substrate joined with each other.

As the solvent, an organic solvent can be used, which includes, for example, methanol, ethanol, and acetone. As a mixing ratio (by weight) of the semiconductor and the substrate, a semiconductor/substrate ratio of 10 to 500 is preferred. When the semiconductor is formed of a thin film, the coverage of the substrate is preferably 1% to 50%.

Example 1

Zinc (II) nitrate 6 hydrate and nickel (II) nitrate 6 hydrate were dissolved in distilled water. Thereafter, an aqueous solution dissolving sodium sulfide 9 hydrate was added, followed by stirring for 2 hours. At this time, the total metal ion concentration in the solution was set to be constant at 0.1 mol/L and the ratio of nickel was set at 0.1 wt % relative to the total metal concentration. The stirred suspension solution was centrifuged and redispersed. This operation was repeated three times. After the supernatant was removed, the resultant substance was dried under vacuum. The solid matter obtained was pulverized in a mortar to obtain a nickel-containing zinc sulfide semiconductor powder. X-ray diffraction analysis performed by a diffractometer (RINT-TTR, Rigaku) confirmed that only a crystalline phase of ZnS is present in the powder. Furthermore, measurement of diffuse reflection by a spectrophotometer (UV-3600•ISR-3100, Shimadzu Corporation) confirmed that the powder absorbs light having a wavelength of 550 nm or less.

Thereafter, the powder (500 mg) and 4 mg of a rhenium complex ((Re(dcbpy)(CO)$_3$MeCN)) having a carboxybipyridine ligand were stirred in methanol for 12 hours and dried under vacuum to synthesize a catalyst having the semiconductor and a metal complex joined therein.

Example 2

Zinc (II) nitrate 6 hydrate and copper (II) nitrate 3 hydrate were dissolved in distilled water. Thereafter, sodium sulfide 9 hydrate was added, followed by stirring for 2 hours. At this time, the total metal ion concentration of the solution was set to be constant at 0.1 mol/L and the ratio of copper was set at 4.5 wt % relative to the total metal concentration. The suspension solution stirred was centrifuged and redispersed. This operation was repeated three times. After the supernatant was removed, the resultant substance was dried under vacuum. The solid matter obtained was pulverized in a mortar to obtain a copper-containing zinc sulfide semiconductor powder.

Thereafter, the powder (500 mg) and 4 mg of a rhenium complex ((Re(dcbpy)(CO)$_3$MeCN)) were stirred in methanol for 12 hours and dried under vacuum to synthesize a catalyst having the semiconductor and the metal complex joined therein.

Example 3

Tantalum (V) oxide (manufactured by Wako Pure Chemical Industries Ltd.) was treated in gas flow prepared by mixing ammonia and argon each at a flow rate of 250 sccm, at 750° C. for 12 hours to obtain an orange powder. X-ray diffraction analysis confirmed that crystalline phases of Ta$_3$N$_5$, TaON, and Ta$_2$O$_5$ are present as a mixture in the powder. Spectrophotometry confirmed that the powder absorbs light having a wavelength of 620 nm or less. The powder (500 mg) and 2 mg of a rhenium complex ((Re (dcbpy)(CO)$_3$MeCN)) having a carboxybipyridine ligand were stirred in methanol for 12 hours and dried under vacuum to synthesize a catalyst having the semiconductor and the metal complex joined therein.

Example 4

Tantalum (V) oxide (manufactured by Wako Pure Chemical Industries Ltd.) was treated in gas flow prepared by mixing ammonia and argon each at a flow rate of 250 sccm, at 800° C. for 6 hours to obtain a yellow powder. X-ray diffraction analysis confirmed that only a TaON crystalline phase is present in the powder. Spectrophotometry confirmed that the powder absorbs light having a wavelength of 550 nm or less. The powder (500 mg) and 2 mg of a rhenium complex ((Re (dcbpy)(CO)$_3$MeCN)) having a carboxybipyridine ligand were stirred in methanol for 12 hours and dried under vacuum to synthesize a catalyst having the semiconductor and the metal complex joined therein.

Example 5

Tantalum (V) oxide (3 g) (manufactured by Wako Pure Chemical Industries Ltd.) was treated by use of a treatment furnace made of transparent quartz, in a gas flow prepared by mixing ammonia and argon each at a flow rate of 250 sccm, at 820° C. for 18 hours to obtain a red powder. X-ray diffraction analysis confirmed that only a Ta$_3$N$_5$ crystalline phase is present in the powder. Spectrophotometry confirmed that the powder absorbs light having a wavelength of 620 nm or less. The powder (500 mg) and 1 mg of a rhenium complex ((Re (dcbpy)(CO)$_3$MeCN)) having a carboxybipyridine ligand were stirred in methanol for 12 hours and dried under vacuum to synthesize a catalyst having the semiconductor and the metal complex joined therein.

Comparative Example 1

Nickel-containing zinc sulfide semiconductor powder used in Example 1 was used as Comparative Example 1.

Comparative Example 2

Tantalum (V) nitride semiconductor powder used in Example 3 was used as Comparative Example 2.

Comparative Example 3

Rhenium complex ((Re(dcbpy)(CO)$_3$MeCN)) used in Examples 1 to 5 was used as Comparative Example 3.

Comparative Example 4

Commercially available titanium oxide (Product No. ST-01, manufactured by Ishihara Sangyo Kaisha, Ltd.), was treated with heat in ammonia gas at 575° C. for 3 hours to prepare nitrogen-doped titanium oxide. It is confirmed that this powder has anatase crystals and can absorb light having a wavelength of 550 nm or less. The rhenium complex (4 mg) of Comparative Example 3 was allowed to adsorb to this powder (500 mg) in the same method as in Example 5 and used as Comparative Example 4.

<Evaluation of Photocatalyst Performance>

The substances obtained in Examples 1 to 5 and Comparative Examples 1 to 4 were evaluated for performance as a photocatalyst. In a test tube, dimethyl formamide and triethanol amine (5 mL in total) were placed at a volume ratio of 40:1, and 2 mg of each of the substances obtained in Examples 1 to 5 and Comparative Examples 1 to 4 was added. In this manner, individual solutions were prepared.

Thereafter, carbon dioxide gas was supplied from a compressed gas cylinder to each of the solutions, and bubbling was performed for 15 minutes or more. In this way, oxygen was purged from the solution and simultaneously carbon dioxide was dissolved in the solution. To avoid air contamination, the test tube was sealed with a rubber stopper.

Each of these samples was irradiated with light emitted from a 500 W xenon lamp (manufactured by Ushio Inc.) and the reaction rate of the photocatalyst was evaluated. At this time, since it was previously found, from the transmission spectrum, that the rhenium complex of Comparative Example 3 cannot absorb light having a wavelength of 490 nm or more, only light having a wavelength of 490 nm or more was applied to the samples by using a filter (SC50, manufactured by Sigma Koki Co., Ltd.) capable of cutting the light in the shorter wavelength range. Furthermore, in the upstream region, a filter absorbing a heat ray was inserted, thereby suppressing a temperature increase of the above filter and each sample as much as possible.

A product generated by light irradiation was evaluated by gas chromatography. Active carbon was used as a column, and helium was used as a carrier gas. As a detector, a thermal conductivity detector (TCD) was used.

Figure 2:
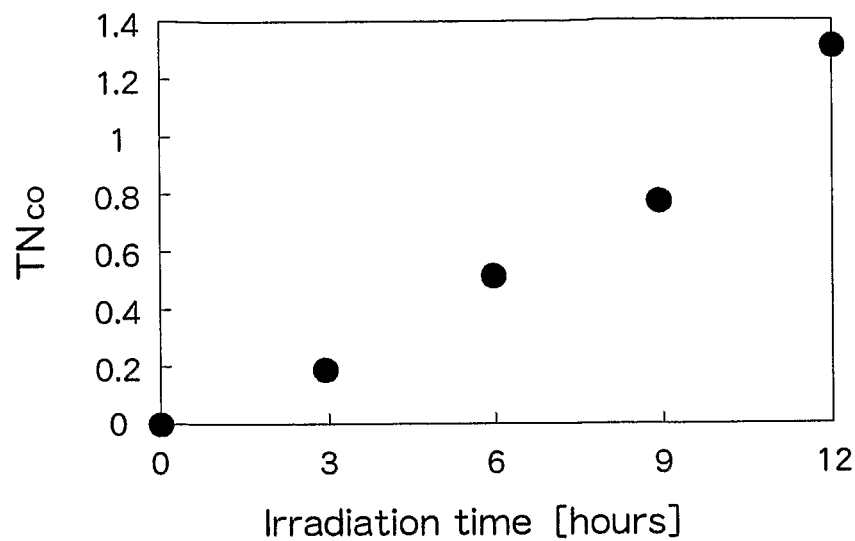
FIG. 2 is a graph showing variation in amount of carbon monoxide with light irradiation time in Example 1.
Figure 4:
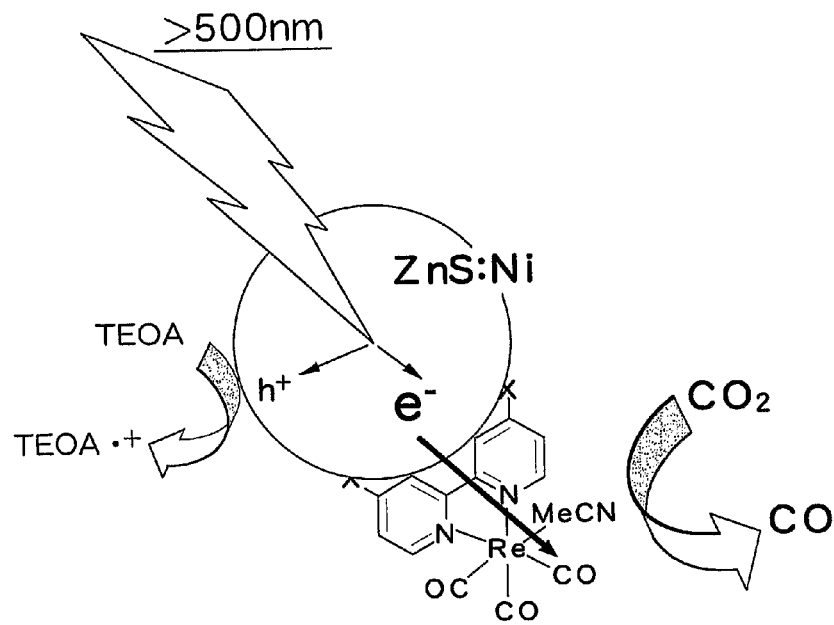
FIG. 4 is a view illustrating the reaction in Example 1 of the present invention.

FIG. 2 shows variation with time (12 hours) of the amount of carbon monoxide generated by applying light to the sample of Example 1. The vertical axis indicates not a measured concentration value but a turnover number $TN_{co}$, which is obtained by dividing the mol number of generated carbon monoxide by the mol number of the complex catalyst contained in the system. The concentration of carbon monoxide increases with the passage of the irradiation time, and the number of molecules of carbon monoxide generated is greater than that of the complex catalyst. In this experiment, hydrogen is not produced by light irradiation. FIG. 4 illustrates the reaction of Example 1.

Figure 3:
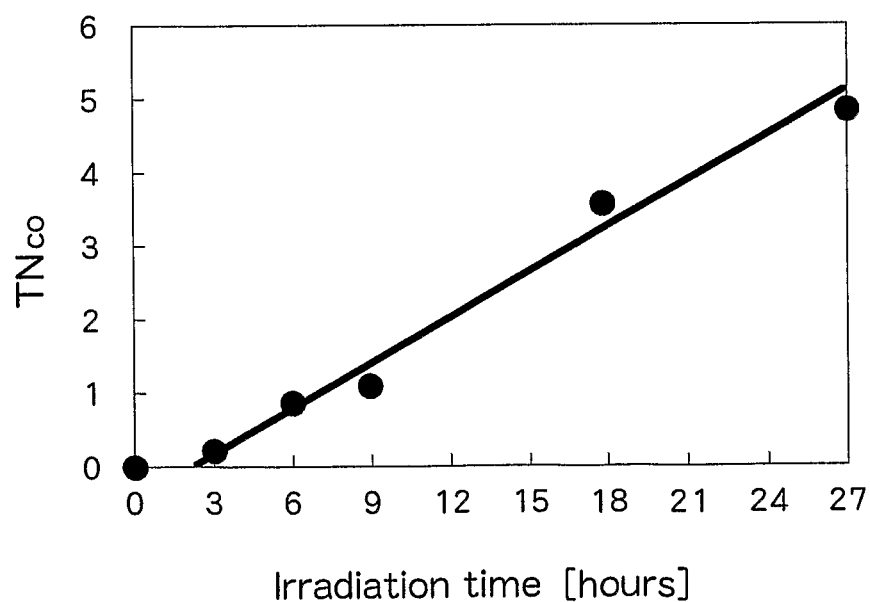
FIG. 3 is a graph showing variation in amount of carbon monoxide with light irradiation time in Example 3.

FIG. 3 shows variation with time (27 hours) of the amount of carbon monoxide (generated by applying light to the sample of Example 3). The concentration of carbon monoxide increases with the passage of irradiation time. The number of molecules of carbon monoxide generated is greater than that of the complex catalyst. Hydrogen is not generated by light irradiation herein.

Generally, when a semiconductor alone is used as a photocatalyst, since the surface of a semiconductor film and powder is not formed uniformly; in other words, e.g., numerous defects and structural bumps are present at an atomic level, the surface energy locally varies depending upon the site of the surface. Therefore, adsorption properties of reaction substrates such as carbon dioxide, a proton, a solvent, a gas, and an intermediate reaction product differ. Accordingly, when electrons are supplied to these substances, the probability and rate thereof differ. The reaction does not proceed at a constant rate. A plurality of types of reactions may conceivably proceed simultaneously to generate various types of reaction products.

On the other hand, when a semiconductor is joined with a catalyst substrate such as a metal complex, the reaction between electrons and carbon dioxide is conceivably carried out not on the surface of the semiconductor but mostly on the surface of the substrate. In this case, for example, when the substrate is formed of a metal complex, the ligand on the metal complex becomes a reaction site. Therefore, variance in adsorption properties of reaction substrates as mentioned above is suppressed and reaction selectivity intrinsic to the metal complex can be maintained in the complex.

The same phenomenon occurs not only when only a semiconductor is excited by light but also when both a semiconductor and a substrate are excited by light, since electrons are concentrated on the reaction site on the substrate.

Table 1 shows the measurement results of the concentration of carbon monoxide generated after light irradiation is performed for 6 hours in Examples 1 to 5 and Comparative Examples 1 to 4. The unit is nano gram (ng).

TABLE 1

|  | Carbon monoxide concentration [arbitrary unit] |
|---|---|
| Example 1 | 66 |
| Example 2 | 120 |
| Example 3 | 249 |
| Example 4 | 180 |
| Example 5 | 143 |
| Comparative Example 1 | 0 |
| Comparative Example 2 | 56 |
| Comparative Example 3 | 0 |
| Comparative Example 4 | 0 |

In Comparative Examples 1, 3, and 4, carbon monoxide is not generated by light irradiation. In Comparative Example 1, it is considered that the semiconductor powder can absorb irradiation light having a wavelength of 490 nm or more but cannot reduce carbon dioxide to carbon monoxide. In Comparative Example 3, it is considered that the rhenium complex cannot absorb irradiation light having a wavelength of 490 nm or more and thus a catalytic action causing a reductive reaction does not occur. Furthermore, another reason is conceivable. In the rhenium complex, the lifetime of photoexcited electrons is short, and therefore the probability of electrons migrating to a reaction site on the complex is low. Therefore, even if the complex absorbs light, it is not enough to cause a reaction. In Comparative Example 4, it is considered that since the potential of the conduction band minimum (CBM) of a semiconductor is lower than the potential of the lowest unoccupied molecular orbital (LUMO) of the metal complex, excited electrons generated within the semiconductor cannot transfer to the metal complex.

In contrast, Examples 1 and 2 demonstrate that since a semiconductor and a metal complex are joined to form a composite, the catalytic action causing a reductive reaction can be induced by light irradiation to produce carbon monoxide.

Table 2 shows some of the results of Table 1, together with the potential of the conduction band minimum (CBM) of a semiconductor and the potential of the lowest unoccupied molecular orbital (LUMO) of a metal complex. The numerical values shown in the column "CBM, LUMO position" are values relative to the standard hydrogen electrode potential. The unit is volt (V). These values are converted from the potential of the uppermost portion of the valence band of a semiconductor (measured by photoelectron spectroscopy in Air (AC-2, Riken Keiki Co., Ltd.)) or the potential of the highest occupied molecular orbital (HOMO) and the bandgap value obtained by a spectrophotometer. LUMO used herein means the same as the lowest unoccupied molecular orbital.

TABLE 2

|  | CBM, LUMO position | Yield of carbon monoxide |
|---|---|---|
| Example 1 | −0.9 | 66 |
| Example 3 | −1.3 | 249 |
| Example 5 | −1.3 | 143 |
| Comparative Example 3 | −1.1 | 0 |
| Comparative Example 4 | −0.2 | 0 |

The LUMO value of the rhenium complex of Comparative Example 1 is −1.1V. In this case, since the rhenium complex cannot absorb light, carbon monoxide is not produced as mentioned above. Also in Comparative Example 4, since the CBM position of the semiconductor is 0.9 V closer to the positive side than the LUMO of the joined rhenium complex, carbon monoxide is not generated as mentioned above. In contrast, in Example 1 in which the CBM position of the semiconductor is 0.2 V closer to the positive side and in Examples 4 and 5 in which the CBM position of the semiconductor is 0.2 V closer to the negative side, carbon monoxide is generated.

Next, Examples of the present invention are shown where a $[Ru(bpy)_2(CO)_2]^{2+}$ (bpy=2,2'-bipyridine) complex catalyst, which electrochemically produces formic acid from $CO_2$, is used in combination with a photocatalyst semiconductor to carry out a formic acid production reaction specific to $[Ru(bpy)_2(CO)_2]^{2+}$ by light irradiation.

Example 6

Tantalum chloride (5 g) (Wako Pure Chemical Industries Ltd.) was dissolved in ethanol (100 mL). To this, a 5% aqueous solution of $NH_3$ was added to a final volume to 300 mL, followed by stirring for 5 hours to prepare a tantalum oxide powder. The white powder was placed in the air and treated with heat at 800° C. for 5 hours, and thereafter, treated under air flow prepared by mixing ammonia ($NH_3$) gas (0.4 L/min) and argon (Ar) gas (0.2 mL/min) at 575° C. for 5 hours to prepare a yellow powder of nitrogen doped tantalum oxide (N-doped $Ta_2O_5$). To a test tube of 8 mL, a solution (4 mL) containing acetonitrile and triethanolamine (TEOA) serving as an electron donor in a volume ratio of 5:1 was placed, and further the N-doped $Ta_2O_5$ powder (5 mg) and a complex catalyst $[Ru(bpy)_2(CO)_2]^{2+}$ (bpy=2,2'-bipyridine) using ruthenium as a core (in an amount corresponding to a concentration of 0.05 mM) were added, and thereafter, $CO_2$ gas was supplied to the solution for 15 minutes to saturate the solution with $CO_2$ gas. The test tube was sealed with a rubber stopper.

Example 7

To a test tube of 8 mL, a solution (4 mL) containing acetonitrile and triethanolamine (TEOA) in a volume ratio of 5:1 was placed, and the same nickel-containing zinc oxide powder (5 mg) as used in Example 1 and a complex $[Ru(bpy)_2(CO)_2]^{2+}$ (bpy=2,2'-bipyridine) having ruthenium as a core and a bipyridine ligand (in an amount corresponding to a concentration of 0.05 mM) were added and thereafter, $CO_2$ gas was supplied to the solution for 15 minutes to saturate the solution with $CO_2$ gas. The test tube was sealed with a rubber stopper.

Comparative Example 5

A test tube containing the same solution as used in Example 6, except that triethanol amine (TEOA) was not used, was sealed with a rubber stopper.

Comparative Example 6

A test tube containing the same solution as used in Example 6, except that argon (Ar) gas was supplied to the solution in place of $CO_2$ gas for 15 minutes to saturate the solution with Ar gas, was sealed with a rubber stopper.

Comparative Example 7

A test tube containing the same solution as used in Example 6, except that a complex $[Ru(bpy)_2(CO)_2]^{2+}$ was not used, was sealed with a rubber stopper.

Comparative Example 8

A test tube containing the same solution as prepared in Comparative Example 7, except that argon (Ar) gas was supplied to the solution in place of $CO_2$ gas for 15 minutes to saturate the solution with Ar gas, was sealed with a rubber stopper.

Comparative Example 9

A test tube containing the same solution as used in Example 7, except that argon (Ar) gas was supplied to the solution in place of $CO_2$ gas for 15 minutes to saturate the solution with Ar gas, was sealed with a rubber stopper.

Comparative Example 10

A test tube containing the same solution as used in Example 6, except that the N-doped $Ta_2O_5$ powder was not used, was sealed with a rubber stopper.

Comparative Example 11

A test tube containing the same solution as prepared in Comparative Example 10, except that argon (Ar) gas was supplied to the solution in place of $CO_2$ gas for 15 minutes to saturate the solution with Ar gas, was sealed with a rubber stopper.

Comparative Example 12

A test tube containing the same solution as used in Example 6, except that the N-doped $Ta_2O_5$ powder and a complex catalyst $[Ru(bpy)_2(CO)_2]^{2+}$ were not used, was sealed with a rubber stopper.

Comparative Example 13

A test tube containing the same solution as prepared in Comparative Example 12, except that argon (Ar) gas was supplied to the solution in place of $CO_2$ gas for 15 minutes to saturate the solution with Ar gas, was sealed with a rubber stopper.

The test tubes prepared in Examples 6 and 7 and Comparative Examples 5 to 13 were irradiated with visible light of the radiation light emitted from a Xe lamp (Ushio Inc.) by use of a carousel system irradiation apparatus through a heat ray absorption filter (manufactured by Asahi Glass Co., Ltd.) and a UV ray cut filter (40 L, manufactured by Sigma Koki Co., Ltd.) for 16 hours, while the solutions within the tubes were stirred by a stirrer. After light irradiation, the gas of the gaseous phase above the solution was analyzed by gas chromatography and the compound of the liquid phase was analyzed by ion chromatography.

Figure 5:
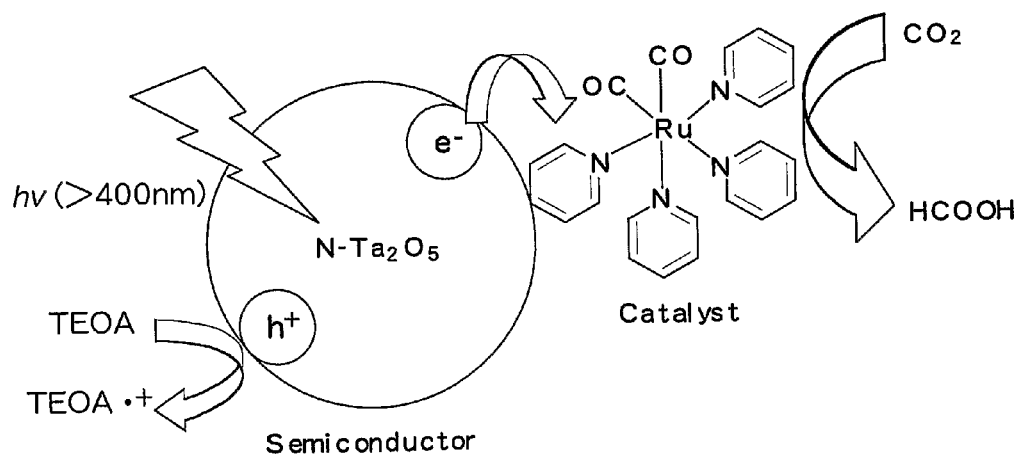
FIG. 5 is a view illustrating the reaction in Example 6 of the present invention.

The products obtained after light irradiation were analyzed. The results are shown in Table 3. In the column [HCOOH], the amount of formic acid generated is shown in terms of mol concentration. Furthermore, TN represents the number of turnovers of each product (product (mol number)/ complex catalyst (mol number)). As is shown in Comparative Examples 7, 8, 10, and 11 where the N-doped $Ta_2O_5$ semiconductor or the complex $[Ru(bpy)_2(CO)_2]^{2+}$ was used singly, the concentration of formic acid is 0.02 mM or less. This means that the N-doped $Ta_2O_5$ has a low ability or no ability to reduce $CO_2$ to produce formic acid by light irradiation. In other words, the amount of formic acid generated is as low as the contamination (impurity) level. Furthermore, complex $[Ru(bpy)_2(CO)_2]^{2+}$ is known as a catalyst for electrochemically reducing $CO_2$ into formic acid; however, the low concentration also means that the complex substantially has no ability to produce formic acid by light irradiation. However, when both are present as in Example 6, the concentration of produced formic acid is increased by a factor of at least 22 times. This is as high as 20 times even compared to the case of Comparative Example 5 where no triethanolamine is present and to the case of Comparative Example 6 where no $CO_2$ is present in the solution. Moreover, in Example 6, both carbon monoxide and hydrogen are produced; however, their mol numbers are each about 10% that of formic acid. From these, the electrons, which are generated from N-doped $Ta_2O_5$ by light irradiation, transfer to the complex catalyst and produce formic acid in the manner intrinsic to $[Ru(bpy)_2(CO)_2]^{2+}$, as is shown in the scheme of FIG. 5. The same reaction is observed when a carbon dioxide isotope $^{13}CO_2$ is supplied. Since $H^{13}COOH$ is detected by $^{13}$C-NMR measurement, it can be demonstrated that formic acid is produced from neither acetonitrile nor triethanolamine in the solution but from $CO_2$ supplied thereto. On the other hand, when the system using a nickel-containing zinc sulfide powder is used as in Example 7, the production amount of formic acid has no significant difference. This is highly likely conceivable because a semiconductor and a complex serving as the substrate are not joined in this system.

TABLE 3

| | Catalyst | Supplied gas | TEOA | [HCOOH]/mM | $TN_{HCOOH}$ | $TN_{co}$ | $TN_{H2}$ |
|---|---|---|---|---|---|---|---|
| Example 6 | N—$Ta_2O_5$ + $[Ru(bpy)_2(CO)_2]^{2+}$ | $CO_2$ | Present | 0.578 | 11.4 | 0.9 | 1.3 |
| Comparative Example 5 | N—$Ta_2O_5$ + $[Ru(bpy)_2(CO)_2]^{2+}$ | $CO_2$ | Not present | 0.004 | ~0.1 | 0.0 | n.d. |
| Comparative Example 6 | N—$Ta_2O_5$ + $[Ru(bpy)_2(CO)_2]^{2+}$ | Ar | Present | 0.028 | 0.6 | n.d. | 0.9 |
| Comparative Example 7 | N—$Ta_2O_5$ | $CO_2$ | Present | 0.019 | Not detected | ~0.1 | ~0.1 |
| Comparative Example 8 | N—$Ta_2O_5$ | Ar | Present | 0.026 | Not detected | n.d. | ~0.1 |
| Example 7 | Ni—ZnS + $[Ru(bpy)_2(CO)_2]^{2+}$ | $CO_2$ | Present | 0.013 | 0.3 | 0.3 | ~0.1 |
| Comparative Example 9 | Ni—ZnS + $[Ru(bpy)_2(CO)_2]^{2+}$ | Ar | Present | 0.019 | 0.4 | n.d. | ~0.1 |
| Comparative Example 10 | $[Ru(bpy)_2(CO)_2]^{2+}$ | $CO_2$ | Present | 0.021 | 0.4 | n.d. | n.d. |
| Comparative Example 11 | $[Ru(bpy)_2(CO)_2]^{2+}$ | Ar | Present | 0.018 | 0.4 | n.d. | n.d. |
| Comparative Example 12 | None | $CO_2$ | Present | 0.012 | Not detected | n.d. | n.d. |
| Comparative Example 13 | None | Ar | Present | 0.014 | Not detected | n.d. | n.d. |

Table 4 shows the relationship between LUMO and CBM (conduction band minimum) positions and formic acid production amount in representative examples. The unit of the energy position is V, and the unit of formic acid production amount is microgram (μg). When reduction potential (LUMO) of $[Ru(bpy)_2(CO)_2]^{2+}$ is electrochemically obtained, it is about −1.0 V (vsNHE). Furthermore, the CBM (conduction band minimum) position of the N-doped $Ta_2O_5$ semiconductor is about −1.5 V (vsNHE). From this, it is clear that, in the reaction system, when the energy level of CBM differs from that of LUMO as shown in Example 6, formic acid is produced.

TABLE 4

| | CBM position | LUMO position | Formic acid yield |
|---|---|---|---|
| Example 6 | −1.5 | −1.0 | 102 |
| Example 7 | −0.9 | −1.0 | 2 |
| Comparative Example 10 | None | −1.0 | 3 |

In this structure, the metal complex catalyst serving as a substrate is not joined with a semiconductor before light irradiation, but the substrate and semiconductor can be frequently brought into contact with each other by stirring of the solution. Accordingly, excited electrons of the semiconductor transfer to the complex catalyst to cause the photocatalyst reaction, which is a feature of the present invention.

From the foregoing, so long as Examples are concerned, when a value obtained by subtracting the LUMO potential of a metal complex (serving as a substrate) from the CBM potential of a semiconductor is +0.2 V or less in terms of the standard hydrogen electrode potential, the advantages of the invention can be significantly provided.

However, electron transfer occurs stochastically and outside the range of this Example. Actually, it is difficult to impose numerical limitation. For example, in a semiconductor, numerous impurity levels are present at the positive side of the conduction band minimum (CBM). Therefore, the above numerical range is not the only limitation. The advantage of the invention can be obtained in the case where photoexcited electrons of a semiconductor can transfer to the substrate even outside the numerical limitation.

Furthermore, in Comparative Example 2, carbon monoxide is produced by applying light only to a semiconductor. However, the concentration of carbon monoxide is low compared to that of the corresponding Example 3. This means that Example 3 demonstrates that the rate of generating carbon monoxide can be drastically improved by joining the semiconductor and the substrate.

In short, in the photocatalysts of Examples 1 to 5, it is considered that the catalytic reaction, which occurs with high efficiency and high reaction-product selectivity, is caused by transfer of photoexcited electrons, which are generated within the semiconductor as a result of applying light (solar light, artificial light) to the substrate joined with the semiconductor.

Further, in addition to these examples described as embodiments, it was verified that formic acid was generated by applying visible light in a system obtained by coupling, as a substrate, a complex [Ru(dcbpy)(bpy)(CO$_2$)$^{2+}$ ((dcbpy)4,4'-dicarboxy-2,2'-bipyridine)] having a carboxybipyridine ligand to the surface of nitrogen-doped tantalum oxide, saturating CO$_2$ gas in solution in which acetonitrile and triethanolamine (TEOA) as an electron supplier are mixed at a volume ratio of 5:1, and sealing the resultant with a rubber plug. As such, generating formic acid according to the present invention can be implemented in the coupled system.

It was further verified that, in a system in which nitrogen-doped tantalum oxide or a Zn-doped GaP film were used as a semiconductor electrode in place of the powder, and bias voltage was applied from outside instead of using a sacrificial reagent such as triethanolamine, formic acid was generated by transfer to a complex [Ru(bpy)$_2$(CO)$_2$]$^{2+}$ of excited electrons from these semiconductor electrodes by applying light.

Note that the semiconductor of the present invention is not limited to these exemplified herein. So long as the semiconductor satisfies the concept of the present invention; that is, so long as at least photoelectrons generated within the semiconductor transfer to a complex catalyst serving as a substrate, there may be used light-responsive semiconductors other than tantalum oxide, zinc sulfide, gallium phosphide, silicon carbide, iron oxide, an oxide of copper, indium phosphide, nitrogen-containing copper oxide, and the like.

Furthermore, as a substrate, there may be used other than Re(dcbpy)(CO)$_3$MeCN]$^{2+}$ (dcbpy=di-carboxy-2,2'-bipyridine) and [Ru(bpy)$_2$(CO)$_2$]$^{2+}$ (bpy=2,2'-bipyridine), a complex system containing rhenium as a core, represented by [Re(bpy)$_2$(CO)$_2$L]$^{2+}$ (L=Ligand, catalyst), [Ru(bpy)(trpy)(CO)]$^{2+}$ (bpy=2,2'-bipyridine; trpy=2,2'•6',2''-terpyridine), [Ru(bpy)$_2$(CO)(CHO)]$^+$, [Ru(bpy)$_2$(qu)(CO)]$^{2+}$ (bpy=2,2'-bipyridine; qu=Quinoline) and [Ru(pbn)(bpy)$_2$]$^{2+}$ (pbn=2-(2-pyridyl)benzo[b]-1.5-naphthyridine; bpy=2,2'-bipyridine); and other complex catalysts containing ruthenium as a core. In the case where complex catalysts using other metals such as manganese, palladium, iridium, iron, and copper as a core, even if a complex catalyst itself is not a photocatalyst, it can be used so long as photoexcited electrons generated within a semiconductor transfer to a substrate substance and cause a catalytic reaction. Furthermore, any substrate may be used even if it is not a metal complex but an organic molecule, so long as photoexcited electrons generated within a semiconductor can transfer to the substrate substance and cause a catalytic reaction, when used in combination with the semiconductor. Furthermore, as a reaction solvent, there may be used not only the solvent such as acetonitrile exemplified herein, but also other organic solvents such as dimethyl formamide, acetone, and alcohol. Alternatively, water or a solvent mixture of water and an organic solvent as mentioned above may be used.

The invention claimed is:

1. A photocatalyst in which a semiconductor and a substrate coexist in a state where they exchange electrons with each other, and the substrate causes a catalytic reaction by at least transfer to the substrate of excited electrons which are generated on the semiconductor by applying visible light to the semiconductor
   wherein a value obtained by subtracting (i) an energy-level value of the lowest molecular orbital unoccupied by the electrons of the substrate from (ii) an energy-level value of a conduction band minimum of the semiconductor, is 0.2 eV or less.

2. The photocatalyst according to claim 1, wherein the semiconductor and the substrate are in contact with each other.

3. The photocatalyst according to claim 1, wherein the semiconductor and the substrate are joined.

4. The photocatalyst according to claim 1, wherein the substrate is a metal complex.

5. The photocatalyst according to claim 4, wherein:
   the semiconductor absorbs visible light,
   the metal complex does not act as a photocatalyst under visible light irradiation,
   the semiconductor and the metal complex are joined in a state where electrons in the visible-light-activated semiconductor transfer to the metal complex, and
   the metal complex performs a visible-light-induced reductive reaction which does not occur in either the semiconductor alone or the metal complex alone.

6. The photocatalyst according to claim 5, wherein the catalytic reaction of the metal complex is a reductive reaction of CO$_2$.

7. The photocatalyst according to claim 5, wherein the semiconductor contains at least one of nickel-containing zinc sulfide, copper-containing zinc sulfide, tantalum nitride, tantalum oxynitride, tantalum oxide, zinc sulfide, gallium phosphide, indium phosphide, silicon carbide, iron oxide, and an oxide of copper.

8. The photocatalyst according to claim 1, wherein the substrate is a rhenium complex or a ruthenium complex.

9. The photocatalyst according to claim 8, wherein the substrate is a rhenium complex that includes a carboxybipyridine ligand.

10. The photocatalyst according to claim 8, wherein the substrate is a ruthenium complex that includes a carboxybipyridine ligand.

11. The photocatalyst according to claim 8, wherein:
    the semiconductor absorbs visible light,
    the substrate is a metal complex that does not act as a photocatalyst under visible light irradiation, the semiconductor and the metal complex are joined in a state where electrons in the visible-light-activated semiconductor transfer to the metal complex, and the metal complex performs a visible-light-induced reductive reaction which does not occur in either the semiconductor alone or the metal complex alone.

12. The photocatalyst according to claim 1, wherein the semiconductor contains at least one of nickel-containing zinc sulfide, copper-containing zinc sulfide, tantalum nitride, tantalum oxynitride, tantalum oxide, zinc sulfide, gallium phosphide, indium phosphide, silicon carbide, iron oxide, and an oxide of copper.

13. The photocatalyst according to claim 1, wherein the catalytic reaction of the substrate is a reductive reaction.

14. A photocatalyst having a structure in which a semiconductor and a substrate are joined, wherein a carbon-containing compound is reduced by transfer to the substrate of excited electrons which are generated by applying visible light to the semiconductor wherein a value obtained by subtracting (i) an energy-level value of the lowest molecular orbital unoccupied by the electrons of the substrate from (ii) an energy-level value of a conduction band minimum of the semiconductor, is 0.2 eV or less.

15. A photocatalyst in which a semiconductor and a substrate coexist in a state where they exchange electrons with each other, and the substrate causes a catalytic reaction by at least transfer to the substrate of excited electrons which are generated on the semiconductor by applying visible light to the semiconductor, wherein the substrate is a rhenium complex having a carboxybipyridine ligand or a ruthenium complex having a carboxybipyridine ligand.

* * * * *